United States Patent
Kodeboyina et al.

(10) Patent No.: US 10,516,626 B1
(45) Date of Patent: Dec. 24, 2019

(54) GENERATING CONFIGURATION DATA AND API FOR PROGRAMMING A FORWARDING ELEMENT

(71) Applicant: Barefoot Networks, Inc., Palo Alto, CA (US)

(72) Inventors: Chaitanya Kodeboyina, Los Altos, CA (US); Ramkumar Krishnamoorthy, Cupertino, CA (US)

(73) Assignee: Barefoot Networks, Inc., Santa Clara, CA (US)

( * ) Notice: Subject to any disclaimer, the term of this patent is extended or adjusted under 35 U.S.C. 154(b) by 609 days.

(21) Appl. No.: 15/071,527

(22) Filed: Mar. 16, 2016

(51) Int. Cl.
*H04L 12/947* (2013.01)
*H04L 12/26* (2006.01)
*H04L 12/741* (2013.01)

(52) U.S. Cl.
CPC ............ *H04L 49/25* (2013.01); *H04L 43/045* (2013.01); *H04L 45/74* (2013.01)

(58) Field of Classification Search
CPC ........ H04L 49/25; H04L 45/74; H04L 43/045
See application file for complete search history.

(56) References Cited

U.S. PATENT DOCUMENTS

| | | | | |
|---|---|---|---|---|
| 8,145,733 B1* | 3/2012 | Cheng | ................. | H04L 61/2514 709/220 |
| 9,065,768 B2* | 6/2015 | Luo | .......................... | H04L 45/42 |
| 9,178,801 B1* | 11/2015 | Guichard | ............ | H04L 12/6418 |
| 9,270,586 B2* | 2/2016 | Assarpour | ............... | H04L 45/54 |
| 9,633,131 B2* | 4/2017 | Pignataro | .............. | G06F 16/986 |
| 9,680,588 B2* | 6/2017 | Connolly | ............ | H04L 41/0803 |
| 9,825,867 B2* | 11/2017 | Zou | .......................... | H04L 47/19 |
| 9,912,774 B2* | 3/2018 | Daly | ................... | H04L 67/2804 |
| 9,923,816 B2* | 3/2018 | Kim | ........................ | H04L 69/22 |
| 9,948,518 B2* | 4/2018 | Kamath | .................. | H04L 41/12 |
| 10,084,643 B2* | 9/2018 | Zhang | ..................... | H04W 4/70 |
| 10,122,829 B2* | 11/2018 | Saavedra | ................ | H04L 47/24 |
| 10,135,956 B2* | 11/2018 | Choi | ..................... | H04L 69/161 |
| 2015/0365193 A1* | 12/2015 | Connolly | ............ | H04L 41/0803 398/52 |
| 2015/0379072 A1* | 12/2015 | Dirac | .................... | G06N 99/005 707/693 |
| 2016/0072669 A1* | 3/2016 | Saavedra | ............ | H04L 12/2867 709/220 |
| 2017/0180273 A1* | 6/2017 | Daly | ...................... | H04L 69/22 |

* cited by examiner

*Primary Examiner* — Mounir Moutaouakil
(74) *Attorney, Agent, or Firm* — Compass IP Law PC

(57) ABSTRACT

Some embodiments provide a novel method for simultaneously generating (i) configuration data for configuring a forwarding element (FE) and (ii) application programming interfaces (APIs) for programming the configured FE (e.g., at run time). The method of some embodiments receives a description of the FE's data plane that specifies the packet processing logic of the FE and generates the configuration data based on the received description. The configuration data in some embodiments specifies which protocols (e.g., L2 protocols, L3 protocols, etc.) the FE supports and how the FE performs a set of functionalities to forward network traffic data for the supported protocols. The method of some embodiments also generates a set of APIs based on the received description of the data plane. The APIs can then be used by a run time application (e.g., a control plane software) to program the configured FE at a later time (e.g., at run time).

20 Claims, 8 Drawing Sheets

GENERATING CONFIGURATION DATA AND API FOR PROGRAMMING A FORWARDING ELEMENT

BACKGROUND

In Software Defined Networking (SDN), the control plane is physically separated from the forwarding plane and communicates with the forwarding plane through an interface (e.g., the OpenFlow protocol). OpenFlow uses a match-action mechanism for network packet switching. However, OpenFlow explicitly specifies protocol headers on which it operates. With the growing number of headers in SDN paradigm, OpenFlow has become a less desirable approach for defining packet processing. As such, other protocol-independent languages for configuring switches (e.g., programmable ASICs) have recently emerged. Today, however, when a user describes a specification for a programmable switch, the necessary APIs for programming packet processing by the switch have to be obtained separately (e.g., from the switch's vendor), which negatively affects the switch's usability.

SUMMARY

Some embodiments provide a novel method for simultaneously generating (1) configuration data for configuring a forwarding element (e.g., at initialization time) and (2) application programming interfaces (APIs) for programming the configured forwarding element (e.g., at run time). The method of some embodiments receives a description of the forwarding element's data plane which specifies the packet processing logic of the forwarding element (FE) and generates the configuration data based on the received description. The configuration data in some embodiments specifies which protocols (e.g., L2 protocols, L3 protocols, etc.) the FE supports and how the FE performs a set of functionalities to forward network traffic data for the supported protocols.

In some embodiments, the data plane description is for (1) specifying for a parser of the FE to process a particular set of packet headers and to determine how to parse the different header fields of a packet header, (2) specifying the order of match-action stages in a match-action pipeline of the FE, and (3) specifying the header fields that should be processed by each match-action stage in the pipeline. The FE, in some embodiments, is a reconfigurable forwarding element such as reconfigurable switch, while in other embodiments the FE is a non-reconfigurable forwarding element. A forwarding element, in some embodiments, can be a software or hardware switch, router, network interface controller (NIC), network function appliance (e.g., a load balancer, a firewall, etc.), or any other circuits or logic that is deployed in a physical and/or logical network for forwarding or processing packets.

The method of some embodiments also generates a set of APIs based on the received description of the data plane. The APIs can then be used by a run time application (e.g., a control plane software) to program the configured FE at a later time (e.g., at run time). Through the generated APIs, the control plane is able to determine the policy that should be applied to different packets at any given time in some embodiments. For Instance, the control plane may add new table entries at run time to a set of match-action tables that are configured on the FE during the initialization of the FE. Similarly, the control plane may modify and/or remove one or more existing table entries in and/or from the match-action tables. The table entries specify how the network traffic should be forwarded by the forwarding element.

As an example, a particular routing table can be configured on an L3 forwarding element in such a way that makes the FE capable of performing either equal-cost multi-path (ECMP) routing or next hop routing based on a certain criterion (e.g., based on a header field that exactly matches a certain value, a header field that is within a range of values, etc.). Some embodiments provide a set of APIs for this particular routing table that enables a user to program the L3 FE (e.g., populate entries in the routing table) to perform ECMP routing or next hop routing at run time based on the value of one or more header fields of received packets.

In some embodiments, the data plane description (e.g., a set of functionalities to be implemented on the FE) is written in a high level programming language that is for programming protocol-independent packet processors (i.e., P4 programming language). In some such embodiments a user writes a P4 code to describe the data plane of a forwarding element. The P4 code specifies, among other things, a set of match-action tables to be configured on the FE. Some embodiments provide a compiler that receives the P4 code and produces configuration data to configure these match-action tables on the FE and a set of APIs for each match-action table. In some embodiments, a user (e.g., the same first user who configures the FE or a different user who receives the configured FE from the first user) uses the generated APIs in a run time control plane in order to control the data plane of the FE during the run time (e.g., in order to populate the set of match-action tables at run time with a set of header fields and actions).

When the functionalities of a forwarding element is modifiable by configuration data, each time the user modifies the P4 code to change the configuration on the FE (e.g., to modify a configured table on the FE), the compiler of some embodiments generates the necessary APIs in accordance with the modified configuration. That is, the compiler of some embodiments, not only generates an initial set of APIs at the time of configuration of a forwarding element, but also generates a new set of APIs each time there is a modification in the configuration of the FE (e.g., a new table is added to the FE's specification or an existing table's definition in the specification is modified).

The compiler of some embodiments includes a front-end module that receives the data plane description and generates intermediary data (also referred to as an intermediate representation in some embodiments). In some embodiments, the intermediary data (intermediate representation) includes a table dependency graph and other table related information, which specify what fields, match types, and actions each table includes and the different dependencies between the different match-action tables. The compiler of some embodiments also includes a set of back-end modules. Each of these back-end modules maps the table dependency graph to a different type of forwarding element. That is, each of the back-end modules is a target-specific module that maps the dependency graph onto a particular type of forwarding element. For example, a first back-end module uses the data in the table dependency graph to generate configuration data for a first type of forwarding element (e.g., a hardware switch), while a second back-end module uses the intermediary data to generate configuration data for a second type of forwarding element (e.g., a software switch).

The compiler of some embodiments provides an API generator module as one of the back-end modules that uses the data in the intermediate representation (table dependency graph) in order to generate the APIs. The API generator module in some embodiments is a templating engine that receives (from the intermediate representation) data for each match-action table of the data plane and generates a set of APIs for that table based on the type of the table (e.g., based on the type of resources of the table) and based on the table's dependencies in the table dependency graph. The API generator of some embodiments is capable of generating different styles of APIs, such as Switch Abstraction Interface (SAI) APIs and propriety APIs, for the same match-action table. These different styles of APIs can be used by different control applications to populate the match-action table and to modify the match-action table entries.

In some embodiments each generated API includes a header file and a mapping function (e.g., a C program) that maps the header file to lower level registers of the FE (to modify the registers). A header file, in some embodiments, typically includes a match-spec, which is the key for the table (e.g., to add an entry), an action-spec, which specifies what action to execute, and the parameters for the action (e.g., to associate a meter or a counter with the action). In some embodiments, a same mapping function is used by different API headers that are generated for different tables. In some such embodiments, the function only receives, as a parameter, the name of the table that has to be mapped to the FE.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
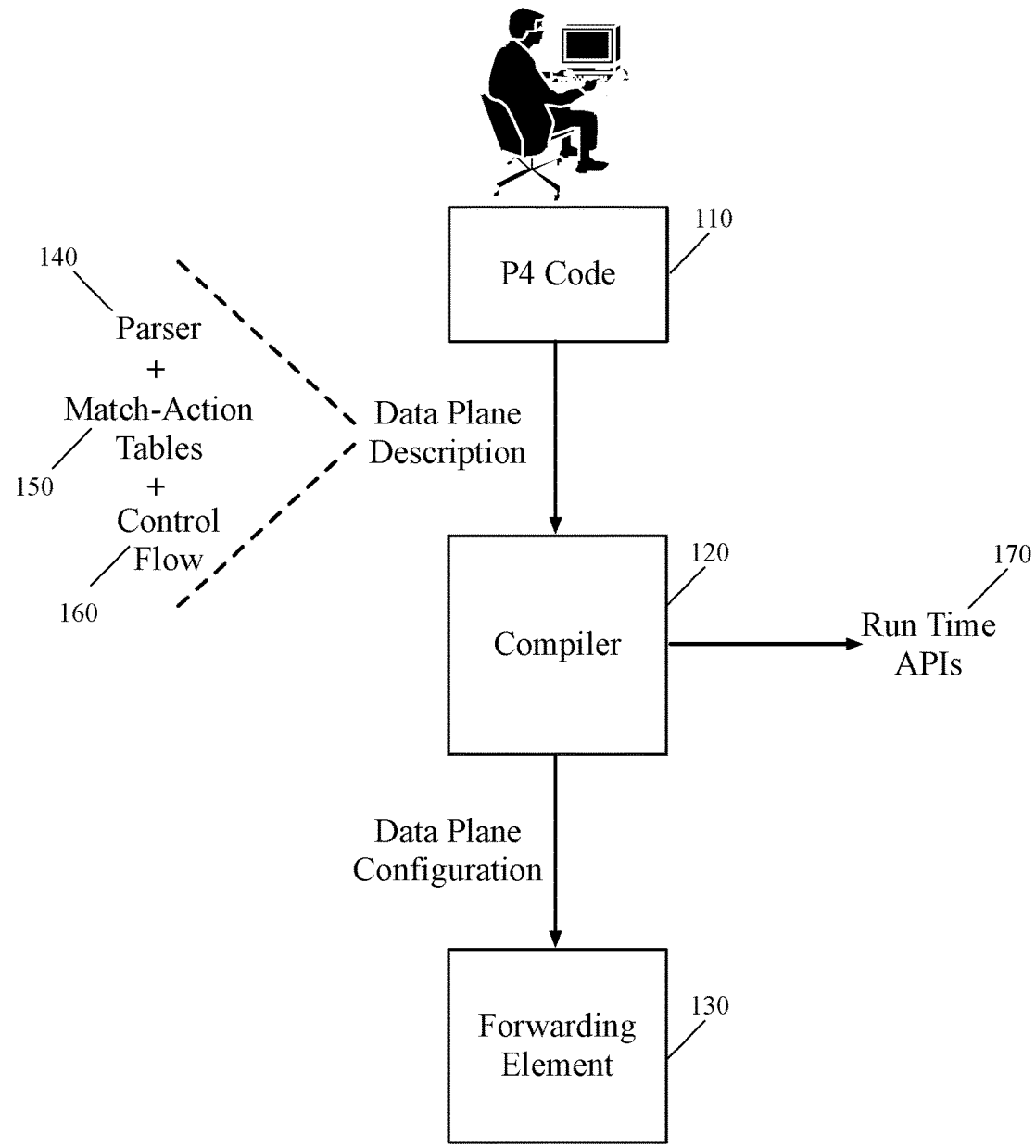
FIG. 1 illustrates a compiler of some embodiments that generates a set of APIs for programming a forwarding element at run time, while compiling code that is written in a programming language for configuring the forwarding element.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide a novel method for simultaneously generating (1) configuration data for configuring a forwarding element (e.g., at initialization time) and (2) application programming interfaces (APIs) for programming the configured forwarding element (e.g., at run time). The method of some embodiments receives a description of the forwarding element's data plane which specifies the packet processing logic of the forwarding element (FE) and generates the configuration data based on the received description. The configuration data in some embodiments specifies which protocols (e.g., L2 protocols, L3 protocols, etc.) the FE supports and how the FE performs a set of functionalities to forward network traffic data for the supported protocols.

In some embodiments, the described data plane is for (1) specifying for a parser of the FE to process a particular set of packet headers and to determine how to parse the different header fields of a packet header, (2) specifying the order of match-action stages in a match-action pipeline of the FE, and (3) specifying the header fields that should be processed by each match-action stage in the pipeline. The FE, in some embodiments, is a reconfigurable forwarding element such as reconfigurable switch, while in other embodiments the FE is a non-reconfigurable forwarding element. A forwarding element, in some embodiments, can be a software or hardware switch, router, network interface controller (NIC), network function appliance (e.g., a load balancer, a firewall, etc.), or any other circuits or logic that is deployed in a physical and/or logical network for forwarding or processing packets.

The method of some embodiments also generates a set of APIs based on the received description of the data plane. The APIs can then be used by a run time application (e.g., a control plane software) to program the configured FE at a later time (e.g., at run time). Through the generated APIs, the control plane is able to determine the policy that should be applied to different packets at any given time in some embodiments. For Instance, the control plane may add new table entries at run time to a set of match-action tables that are configured on the FE during the initialization of the FE. Similarly, the control plane may modify and/or remove one or more existing table entries in and/or from the match-action tables. The table entries specify how the network traffic should be forwarded by the forwarding element.

As an example, a particular routing table can be configured on an L3 forwarding element in such a way that makes the FE capable of performing either equal-cost multi-path (ECMP) routing or next hop routing based on a certain criterion (e.g., based on a header field that exactly matches a certain value, a header field that is within a range of values, etc.). Some embodiments provide a set of APIs for this particular routing table that enables a user to program the L3 FE (e.g., populate entries in the routing table) to perform ECMP routing or next hop routing at run time based on the value of one or more header fields of received packets.

In some embodiments, the data plane description (e.g., a set of functionalities to be implemented on the FE) is written in a high level programming language that is for programming protocol-independent packet processors (i.e., P4 programming language). In some such embodiments a user writes a P4 code to describe the data plane of a forwarding element. The P4 code specifies, among other things, a set of match-action tables to be configured on the FE. Some embodiments provide a compiler that receives the P4 code and produces configuration data to configure these match-action tables on the FE and a set of APIs for each match-action table. In some embodiments, a user (e.g., the same first user who configures the FE or a different user who receives the configured FE from the first user) uses the generated APIs in a run time control plane in order to control the data plane of the FE during the run time (e.g., in order to populate the set of match-action tables at run time with a set of header fields and actions).

FIG. 1 illustrates a compiler of some embodiments that generates a set of APIs for programming a forwarding element at run time, while compiling code that is written in a programming language for configuring the forwarding element. More specifically, the compiler shown in the figure is capable of simultaneously generating (1) configuration data to configure a forwarding element and (2) a set of APIs to program the forwarding element. The configuration data is used to configure the FE during the initialization (or boot time) of the FE in some embodiments, while the set of APIs is used to program the FE at run time in some embodiments. The figure includes a P4 code 110 that is input to a compiler 120 and a forwarding element 130 that is configured by the compiler.

This figure shows that a programmer writes a program code 110 in P4 programming language in order to configure the FE 130. The P4 language is a declarative programming language that is used to program protocol-independent packet processors such as hardware and/or software forwarding elements. The user may obtain (purchase) the forwarding element from a silicon vendor (i.e., a supplier of the FE) and define a processing logic specification for the FE through the P4 code. That is, the configurator of the FE provides a data plane description for the FE through the P4 code.

The data plane description, as shown, includes a parser specification 140, a set of match-action tables specification 150, and a control flow specification 160. These specifications are used to configure different components (e.g., a parser and a match-action unit) of a forwarding element such as the forwarding element that is illustrated below by reference to FIG. 4. For example, the parser specification 140 in the data plane description specifies (1) how to identify different headers of different packets (and different fields of each header) and (2) how to identify valid header sequences within packets. In other words, the parser specification 140 expresses how a parser of a forwarding element is configured so that the parser knows what packet formats to expect (i.e., what header types are possible). As an example, the parser specification 140 specifies the format of an IPv4 header as well as other headers that may follow the IPv4 header.

In some embodiments, the parser specification 140 describes the method of parsing each packet header and even the different header fields in each packet header. The parser of some embodiments also employs a parse graph in addition to the parser specification in order to parse the different headers and header fields of a packet. In some embodiments the parse graph is in the body of the parser specification (i.e., provided by the programmer), while in other embodiments the parse graph is implemented in the parser of the forwarding element, e.g., as a set of entries in ternary content-addressable memories (TCAMs) of the forwarding element. Yet, in some other embodiments, a portion of the parse graph is stored on the FE, while anther portion of the parse graph is generated from the P4 code (by the compiler). Following the declaration of different header types that the FE can process, the data plane description of some embodiments also describes, in the match-action tables specification 150, the header fields processing mechanism using the declared header types and a set of actions.

The match-action table specification 150 is the essential mechanism for performing packet processing. The specification 150 of some embodiments defines the fields (e.g., the packet header fields or metadata that is added during the processing), on which a table may match and the actions that could be executed based on the potential matches. In some embodiments, an action that is defined in the specification 150 is a complex action that includes simpler protocol-independent primitive actions (e.g., add_field, modify_field, count, meter, etc.). The match-action tables and the different stages of a match-action unit of a forwarding element are discussed in more detail below by reference to FIG. 4.

In some embodiments, the control flow specification 160 is a part of the data plane description that includes a collection of functions, conditionals, and table references, through which, the programmer specifies the flow of control between the match-action tables. That is, the control flow specifies the order of execution of the match-action tables that are applied to a received packet. The control flow specification allows the user (e.g., P4 programmer) to express the dependencies (e.g., parallel or serial dependencies) between header fields of a received packet.

After describing the data plane in the P4 code, the user (e.g., the configuration programmer) sends the description of the data plane (i.e., written in P4 code) to the compiler 120 (e.g., by compiling the program). The compiler of some embodiments generates configuration data for the forwarding element 130 based on the type of the forwarding element (e.g., based on the specific resources and structure of the FE). At the same time, the compiler 120 generates a set of APIs that can be used to program the forwarding element at a later time (e.g., at run time). That is, the compiler 120 not only generates the configuration data that is used to configure the FE each time the FE initializes, but also does the compiler generates a set of APIs through which, a network controller (e.g., a control application executing in a controller machine) is able to manage the packet forwarding processing at run time.

In some embodiments, the control application is generated and managed by a user that is different than the user who describes the data plane (i.e., the first user who configures the FE with the P4 code). For example, when a reconfigurable switch is obtained from a silicon vendor by a first user, the user configures the switch by defining the protocols that the switch can process and the way of processing those protocols (e.g., through a set of match-action tables) in the P4 code. However, The first user who configures the switch does not program the processing rules on the configured switch (i.e., does not populate the match-action tables).

In some embodiments, a second user who employs the switch in a network (e.g., a datacenter network) generates the control application to populate the rules on the switch at run time based on the requirements of the network. The control application, however, can program the configured switch only through a set of APIs that enables the application to populate the match-action tables. Conventionally, in order to be able to populate the forwarding rules on the switch, the second user (e.g., datacenter network administrator) had to obtain the required set of APIs from the original vendor of the switch.

The compiler 120, however, eliminates the need for the second user to obtain the required APIs from the switch vendor. Instead, with the compiler 120, at the same time that the configuration data for the switch is generated, the required APIs, through which to communicate with the configured switch, are also generated. As such, the datacenter administrator obtains the configured switch with the required APIs together from the configurator of the switch. In some embodiments, the user who configures the switch may also program the switch using the generated set of APIs.

When the functionalities of a forwarding element is modifiable by configuration data, each time the user modifies the P4 code to change the configuration on the FE (e.g., to modify a configured table on the FE), the compiler of some embodiments generates the necessary APIs in accordance with the modified configuration. That is, the compiler of some embodiments, not only generates an initial set of APIs at the time of configuration of a forwarding element, but also generates a new set of APIs each time there is a modification in the configuration of the FE (e.g., a new table is added to the FE's specification or an existing table's definition in the specification is modified).

As described above, the forwarding element 130, in some embodiments, is a reconfigurable ASIC, or a fixed-function (i.e., non-programmable) switch. Examples of a forwarding element include a network processing unit (NPU), a software and/or hardware switch, a software and/or hardware router, a software and/or hardware network interface controller (NIC), and a software and/or hardware middlebox (e.g., a load balancer, a firewall, a WAN optimizer, an intrusion detection system, etc.), or any other type of FE that is deployable in a physical and/or logical network. In some embodiments, the generated configuration data is stored on the FE and is used to configure the FE, e.g., each time the FE initializes or boots up.

Figure 2:
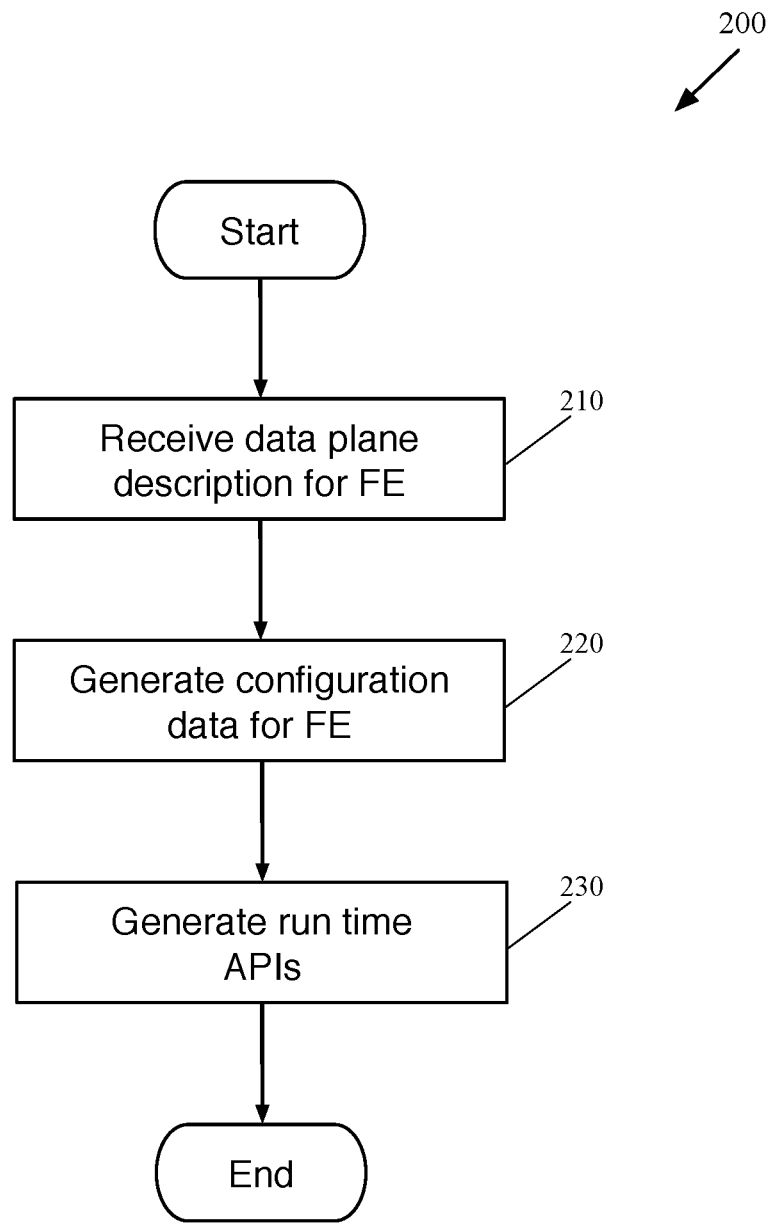
FIG. 2 conceptually illustrates a process of some embodiments that simultaneously generates configuration data for configuring a switch and a set of APIs for programming the configured switch to perform forwarding functionality.

FIG. 2 conceptually illustrates a process 200 of some embodiments that simultaneously generates configuration data for configuring a switch and a set of APIs for programming the configured switch to perform forwarding functionality. The process 200 of some embodiments is performed by a compiler that receives the program code (e.g., P4 code) and compiles the code to generate configuration data.

The process 200 initiates by receiving (at 210) data plane description for a forwarding element. The process of some embodiments, as described above, receives the description in form of P4 code written by a programmer. The code includes different specifications that together specify what protocols can be supported by the forwarding element (i.e., what packet headers are allowed) and how to process a packet of each protocol (i.e., which match and action tables should be executed for each protocol). Specifically, the received code, in some embodiments includes packet header definitions, parse graph, table definitions, action definitions, and the pipeline layout.

The packet header definitions, in some embodiments, define the format of each header within a packet. More specifically, each packet header definition specifies the different fields of the packet header, the size of each field (e.g., the number of bits in each field), and the relative order of fields. The parse graph specifies the permitted header sequences within each packet. As will be described in more detail below by reference to FIG. 5, the compiler generates a general table dependency representation based on the parse graphs and control flow provided in the P4 code. The data in the table dependency representation is used by the compiler to not only generate FE-specific configuration data for different types of FEs, but also to generate the required APIs to populate the match-action tables configured on the FE.

The table definitions, in some embodiments, specifies, for each table, which types of lookups have to be performed (e.g., exact, ternary, etc.), which input fields (i.e., header fields or metadata fields) have to be used in the lookups, and which actions might be applied based on lookup results. In some embodiments, the action definitions include compound actions and the parameters that each action requires to be executed. Each compound action is composed of a set of primitive actions. The pipeline layout or control flow includes the layout of match-action tables within the pipeline and the packet flow through the pipeline in some embodiments.

Based on the received data, the process generates (at 220) configuration data for one or more forwarding elements. That is, the compiler evaluates the expressions that are supported for arithmetic and field values as well as the syntax and semantics used in the program. After the compiler ensures that the code complies with the predefined syntax (i.e., the code is written in a proper format), the compiler allocates the resources required by the program according to availability on each specific target, and generates the initial configuration data for that target.

In addition to generating configuration data, the compiler of some embodiments generates (at 230) a set of APIs for the FE. The set of APIs are employed at run time (by one or more controllers) to program the configured FE. More specifically, through the run time APIs, the controller populates the entries of a match-action table with data values for each field (header field) that is defined as the key to the entry as well as the data values for each parameter that the action function of that entry requires to be executed. In some embodiments, the P4 table declarations are used to generate run time APIs, which include parameters that correspond to the action function parameters for the table entry's action. Typically, the compiler is responsible for ensuring that the values in the run time APIs are properly mapped to and consistent with the P4 program specification.

One of ordinary skill in the art would realize that the specific operations of the process 200 might not be performed in the exact order shown and described. For example, although the operation 220 and 230 are shown as two successive steps, the compiler of some embodiments performs these operations in parallel. In other words, the compiler of some such embodiment, at the same time that generates configuration data for one or more forwarding elements, generates the APIs that could be used later (e.g., at run time) to program the forwarding element. Also, the specific operations might not be performed in one continuous series of operations, and different specific operations may be performed in different embodiments. Furthermore, the process could be implemented using several sub-processes, or as part of a larger macro process.

Figure 3:
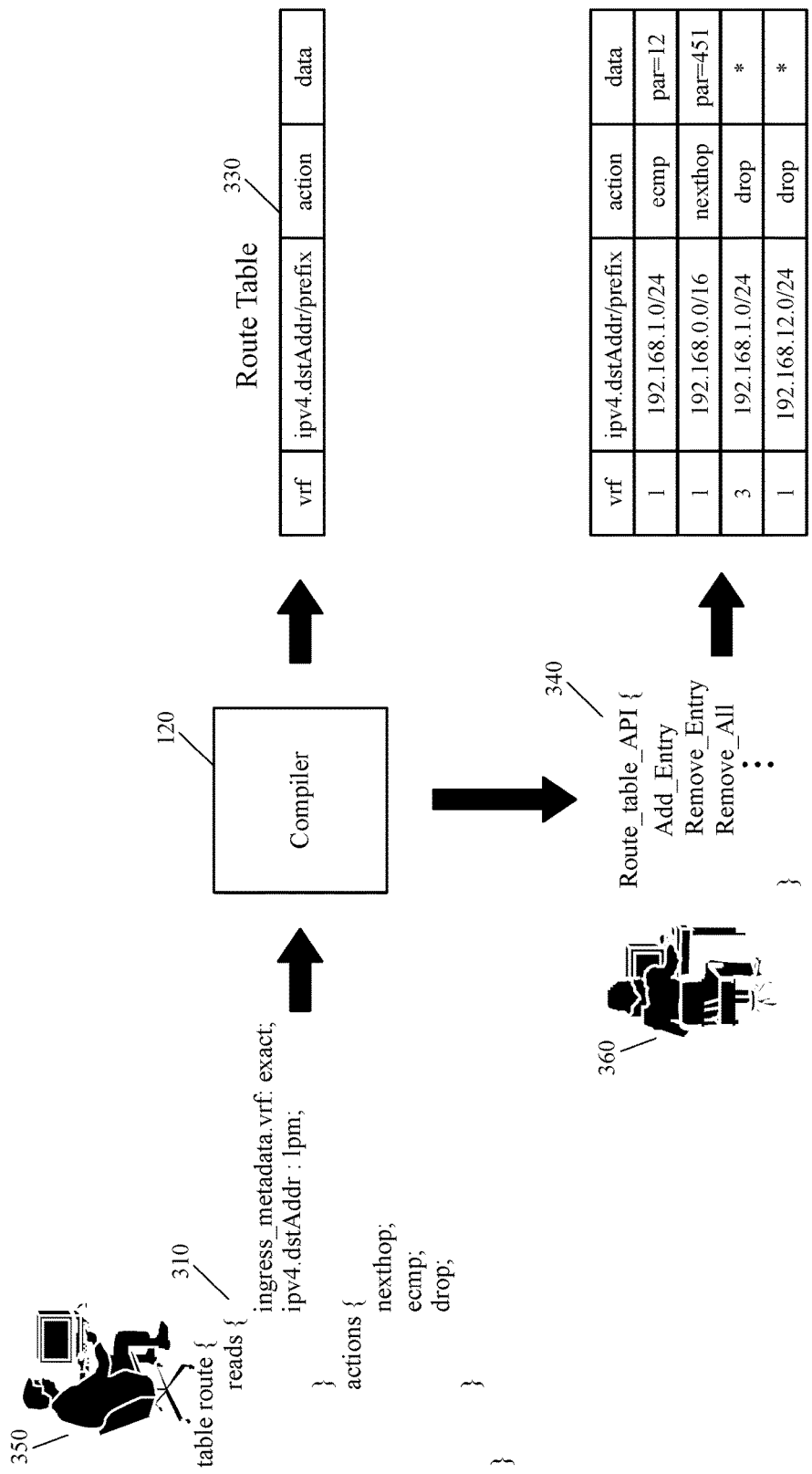
FIG. 3 illustrates an example of data plane description that a compiler of some embodiments receives and the configuration data and APIs that the compiler generates based on the received description, and how the APIs are used to program a configured forwarding element.

FIG. 3 illustrates an example of data plane description that a compiler of some embodiments receives and the configuration data and APIs that the compiler generates based on the received description. The figure also shows how the APIs are used (e.g., by a different user) to program a configured forwarding element in order to perform forwarding functionality. The figure includes a compiler 120 that receives a P4 code 310 from a user 350 and based on the received P4 code, generates configuration data for configuring a route table 330 on a forwarding element. The compiler 120 also generates a set of APIs 340, through which a user 360 is able to populate the configured table (to add new entries to the table, to remove existing entries, or to modify existing entries). The populated table is used to specify how the received packets should be forwarded by the forwarding element.

As shown in the figure, a portion of the data plane description provided by the user 350 is a P4 code 310 to define a route table. The defined route table includes two lookup fields (i.e., two fields against which one or more run time parameters should be matched). However, only the field that represents an IPv4 destination address (i.e., ipv4.dstAdds field) is a header field that is extracted from a received packet (e.g., by the parser). The other field (ingress metadata.vrf) represents a metadata that is added to the packet header fields (e.g., stored in the PHV) by the FE itself (e.g., by the parser of the FE). In some embodiments, the fields of a table (i.e., the header fields and metadata) are defined in another section of the data plane. In some such embodiments, each packet header that is defined in the P4 code includes a header name, a set of header fields, and a length (e.g., in bits) for each header field.

In some embodiments, the different stages of a processing pipeline of a FE do not process the packets only based on the packet headers. For instance, additional metadata may be added to the packet header data (e.g., by the parser of the FE), which is also carried between the different stages of each pipeline, and which is treated identically to the packet header fields. Some examples of metadata include the ingress port, the transmit destination and queue, a timestamp that can be used for packet scheduling, and data passed from table-to-table that does not involve changing the parsed representation of the packet such as a Virtual Routing and Forwarding (VRF) identifier.

The VRF metadata allows for implementation of several virtual routers on a single hardware or software router. That is, multiple instances of a routing table are tagged with different VRFs and as such, different routing table instances can co-exist within the same router at the same time. Because the routing table instances are independent, the same or overlapping IP addresses can be used without conflicting with each other.

The P4 code 310 shows that the type of matching for the VRF field should be an exact match. That is, the FE first determines whether the VRF metadata that is added to the header fields of a received packet exactly matches the VRF field that is populated in a particular row of the routing table. When the FE determines that the VRF matches the value in the particular row, a corresponding action that is populated in the same particular row is executed. Otherwise, no action will be taken. In some embodiments a pointer to the address in which the corresponding action is placed, is stored in the particular row of the table.

The type of matching for the destination address field of the table, as shown, is a Longest Prefix Match (LPM). Because each entry in a forwarding table may specify a sub-network, one destination address may match more than one forwarding table entry. The LPM helps for the most specific of the matching table entries to be selected. For example, in the illustrated example, when two rows of the routing table cover the same subnet of the destination IP address of a packet, based on the LPM matching type selected in the illustrated P4 code, the corresponding action of the row that has the IP address with the longest prefix match will be executed. Other types of matching that can be selected for the fields of a table include ternary matching, valid matching, and range matching in some embodiments. In ternary matching, a field can include a wildcard value. In valid matching, the entire packet header and/or metadata header must match a value. And in range matching, as its name suggests, a header field can be within a range of values in order for a corresponding action to be executed.

The route table shown in the figure also includes three different actions that can be executed if the key entries of the table (i.e., the combination of VRF field and destination address field) match the values received from a packet (e.g., at run time). These three actions are next hop action, equal-cost multi-path action, and drop action. These actions are merely introduced in the table as the valid actions of the table. However, each of these actions may include multiple primitive actions (e.g., add_field, push, count, resubmit, etc.), or other complex actions that are defined as separate functions in other portions of the data plane description. Additionally, each of these functions receives one or more parameters with which, the function works. These parameters, as shown in the figure, are also populated in the tables using the generated APIs. Each table entry could have unique action parameters or one or more entries could share the same action parameters in some embodiments. The generated API will allow for such a variation.

The next hop action causes the FE to perform next hop routing when the key entries of the row of the table in which the next hop action is populated match the values received from a packet header field (and additional metadata). The ECMP action, on the other hand, causes the FE to perform next hop routing when the corresponding key entries match the values received from the packet header. Drop action, as its name suggests, causes the FE to drop the packet that has packet header fields and metadata that match the lookup table.

As shown in the figure, the compiler 120 receives the P4 code portion 310 and after compilation of the code, produces configuration data for configuring a match-action table 330 on the forwarding element. At the same time and in parallel with generating the configuration data, compiler 120 generates a set of APIs in the route table API 340 for later population of the table 330 that is configured on the forwarding element. In other words, the configuration data defines the frame of each match-action table, while the tables are populated through the APIs.

The configuration data in the illustrated example defines four different fields for the route table 330. Specifically, the table 330 includes a vrf field, an ipv4.dstAddr field, an action field, and a parameter data field. The parameter data field includes the values (i.e., one or more parameters) that each corresponding action takes in order to be executed. The parameter data field, in some embodiments, is a data structure that based on the action with which the data field is associated, may include one or more values or even no value. That is, although in the illustrated example, both of the ecmp and nexthop actions require one parameter to be passed to their corresponding functions to execute, the parameter data field for each action may have different number of values (e.g., that are concatenated to each other as one field) depending on the number of parameters that the action function requires.

As described above, the compiler 120 also generates a set of APIs 340. This set of APIs can be used by a user 360 (e.g., a datacenter administrator) who obtains the configured forwarding element and the set of APIs from the user 350, to program the forwarding element to perform packet forwarding processing during run time. That is, the user can populate the table 330 (e.g., add entries, remove entries, modify fields of one or more entries) using the set of APIs 340. In some embodiments, the users 350 and 360 are the same (e.g., a same organization) and not necessarily two different users.

As shown, the user 360 has populated the table 330 with four different entries using the set of APIs 340. For example, the user uses the Add Entry API to generate a new entry in the table and uses the Remove_All API to delete all of the entries of the table at once. Of course, each one of these APIs receives a set of parameters, or no parameter (based on the API function and the fields that should be populated in the table) to generate, delete, or modify the entries of the table.

As illustrated in the figure, the vrf field in the first entry is 1, the ipv4.dstAddr/prefix of the entry is 192.168.1.0/24, and the corresponding action for a packet that carries these two header fields and/or metadata is ecmp. Additionally, the parameter that should be passed to the ecmp function is 12. In other words, the first entry of table 340 indicates that when a packet is received that is tagged (exactly) with VRF 1, and that has a destination IP address of 192.168.1.0/24 (which is the longest prefix for the same subnet), the packet should be sent for ECMP routing to the ecmp function with an identification group parameter of 12. The group identification 12 belongs to a group of output ports to one of which, the packet could be sent. In some embodiments, the FE determines to which port the packet should be sent based on a hashing function that, for example, hashes a particular header field's value in one of the packet headers.

The second entry of table 340 indicates that when a packet is received that is tagged (exactly) with VRF 1, and that has a destination IP address of 192.168.0.0/16 (which is the longest prefix for the same subnet), the packet should be sent for next hop routing to the nexthop function with a port identification parameter of 451 (e.g., that indicates the output port from which the packet is forwarded to the next forwarding device).

The third entry indicates that a packet should be dropped, when the packet is tagged (exactly) with VRF 3, and has a destination IP address of 192.168.1.0/24 (which is the longest prefix for the same subnet). As shown, the data column of the table for this action is "*" (e.g., a wildcard value), which indicates that no parameter is needed for this action. In other words, the drop action does not require any parameter because it simply drops the packet and does not send it to any other port for further forwarding of the packet. Similarly, the fourth entry indicates that a packet should also be dropped, when the packet is tagged (exactly) with VRF 1, and has a destination IP address of 192.168.12.0/24 (which is the longest prefix for the same subnet). As an example, when a packet is received by the FE that has an IPv4 header with a destination address header field of 192.168.12.0/24 and metadata VRF of 1 (e.g., tagged by the parser of the FE), the FE drops the packet and does not perform any of the ECMP or next hop routings on the packet.

As described above, the P4 language is a declarative programming language for specifying how packets are processed by the pipeline of a forwarding element (e.g., a software and/or hardware switch or router). The language is based upon an abstract forwarding model that includes a parser, a set of match-action tables, and a deparser that are in an ingress and/or egress pipeline of the FE. The parser identifies and separates the different headers of each incoming packet from the payload of the packet. After the headers are separated, each match-action table in the set of match-action tables performs a lookup on one or more header fields of one or more headers and applies an action that is associated with the first match within the table.

In other words, in each pipeline, the parser extracts the headers (and their corresponding fields) from the body of the packet and passes the extracted header fields to the match-action tables. While both match-action tables in the ingress pipeline and the match-action tables in the egress pipeline may modify the packet headers, the ingress match-action tables generally determine the egress ports and the queues into which the packet is placed. Based on the ingress processing, the packet may be forwarded, replicated (e.g., for multicast), or dropped. The egress match-action tables generally perform, e.g., when there are multiple instances of a packet in multicasting, packet header modifications on a per packet instance basis. As stated above, the packet headers are generally modified according to the actions that are specified in the P4 program.

Figure 4:
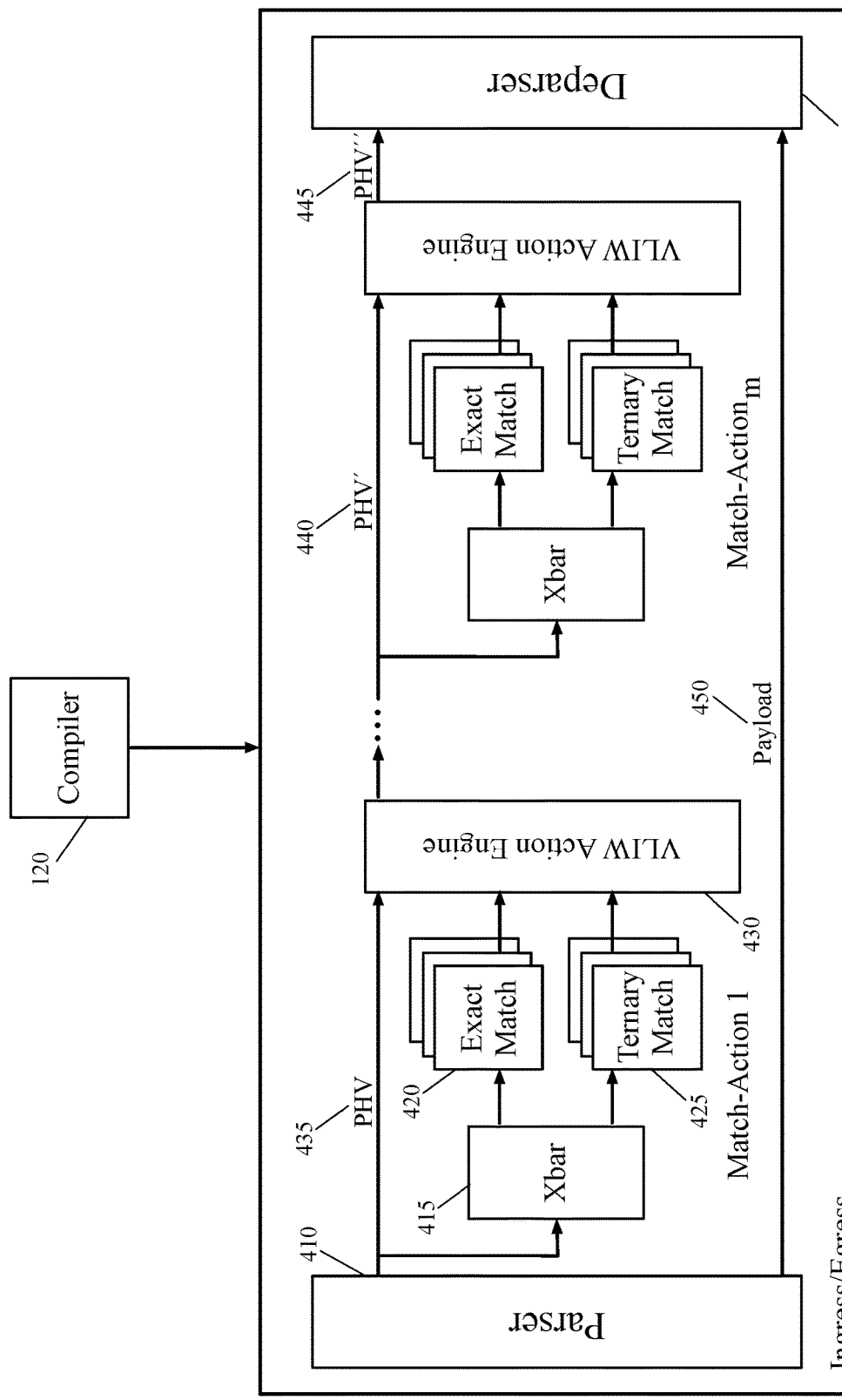
FIG. 4 illustrates an ingress and/or egress pipeline architecture of a forwarding element of some embodiments that includes several configurable match-action stages.

FIG. 4 illustrates an ingress and/or egress pipeline architecture of a forwarding element of some embodiments that includes several configurable match-action stages. More specifically, the figure shows that the pipeline 455 includes a parser 410, a Match and Action Unit (MAU) with multiple match-action stages 1 through m (where m is an integer such as 32 in some embodiment), and a deparser 460. As illustrated, each match-action stage includes an Xbar 415, a set of exact match tables 420, a set of ternary match tables 425, and a Very Long Instruction Word (VLIW) action engine 430.

The different components of a forwarding element (e.g., parser, MAU, deparser, and queuing system which is not shown in the figure) perform different functions in order to process a packet that is received by the forwarding element. In a nutshell, the ingress pipeline receives a packet (e.g., through an I/O module), parses the packet into a Packet Header Vector (PHV), sends the PHV through a set of match and action stages which may modify the PHV, deparses the packet headers back from the PHV into packet format, and enqueues the packet in a centralized data buffer. The centralized data buffer receives the packets that are processed by the ingress pipeline and provides a large shared buffer (storage) that accommodates the queuing delays due to oversubscription of the output channels of the ingress deparser.

Similar to the ingress interface, the egress interface of some embodiments receives the packet from the queuing system, separates the packet payload from the packet headers, stores the packets headers in a PHV, sends the PHV through an ingress pipeline of match and action stages, deparses the packet headers back from the PHV into packet format, and sends the packet to an appropriate output port of the switch to be driven off the switch (e.g., through one of the output channels). The output packet may be the same packet as the input packet (i.e., with identical packet headers), or it may have different packet headers compared to the input packet based on the actions that are applied to the packet headers in the ingress and egress pipelines (e.g., different header field values for certain header fields and/or different sets of header fields).

As described above, the parser 410 receives a packet (e.g., through a set of input modules of the switch) and extracts the packet headers (e.g., Ethernet header, IPv4 header, IPv6 header, TCP header, UPD header, tunnel encapsulation headers, etc.) from the body of the packet. In some embodiments, the parser 410 separates the header field values that may be processed by the MAU from the rest of the header field values in each packet header. In some other embodiments the parser separates the packet headers that might be processed by the MAU from the rest of the packet headers. The header fields of a packet header are the different segments of the packet header, each of which stores a particular value representing a particular piece of data. For example, an IPv4 packet header includes a source IP address header field, a destination IP address header field, an IPv4 identification field header field, a time-to-live header field, etc.

The parser of some embodiments determines which packet headers (or header fields) may be processed by the MAU based on configuration data that the parser receives from the compilers 120 (e.g., from a configurator module at the initialization time of the switch). While the parser 410 separates the headers (or header fields) that may be processed by the MAU from the rest of the headers (or header fields) of the different packet, the parser stores the participating headers (or header fields) in the PHV 435 (e.g., in different registers of the PHV) and delivers the PHV to the MAU for further processing of the header data.

In some embodiments the PHV includes a set of different size registers or containers. For instance, in some embodiments the PHV includes sixty-four 8-bit registers, ninety-six 16-bit registers, and sixty-four 32-bit registers (for a total of 224 registers containing 4096 bits), though other embodiments may have any different numbers of registers of different sizes. In some embodiments, the parser 410 stores each extracted packet header (or header field) in a particular subset of one ore more registers of the PHV. For example, the parser might store a first header field in one 16-bit register and a second header field in a combination of an 8-bit register and a 32-bit register (e.g., if the header field is 36 bits long).

The MAU of some embodiments includes a set of different stages, each of which is configured (by the compiler 120) to process a particular set of header fields stored in the PHV. In some embodiments, each of these stages is reconfigurable by a controller (not shown) that is responsible for configuring (and reconfiguring) the stages of the match-action units of the switch to match against various different packet header fields and take the required action based on the result of the match. In some such embodiments, the compiler generates the configuration data but it is the controller's duty to configure the switch each time the switch boots up.

In some embodiments, the output PHV 435 from the parser 410 is delivered to both the Xbar 415 and the VLIW action engine 430. The Xbar 415 of each stage, in some embodiments, includes a set of one or more crossbars (e.g., two crossbars) that identifies which field or fields of the PHV are used by the match tables of the corresponding stage of the MAU, and delivers the identified fields to the exact match tables 420 and ternary match tables 425 of the stage. For instance, if the match tables of a particular stage are configured to match against a source IP address field that is carried by one or more PHV registers, the Xbar 415 of that particular stage takes the IP source field from the PHV register(s) and delivers the field to the match tables. In some embodiments, the Xbar 415 operates at a bit level. That is, a particular header field that contains 20 bits might be carried by a 16-bit register and a portion of an 8-bit register of the PPHV. The Xbar of some such embodiments, therefore, passes only 20 bits of the data that is carried by the combination of the 16-bit register and the 8-bit register to its corresponding match tables.

As illustrated in FIG. 4, each match-action stage of the MAU includes a set of ternary match tables 425 and a set of exact match table 420. Some embodiments implement (1) the ternary match tables with ternary content addressable memory (TCAM) units, and (2) the exact match tables with static random-access memory (SRAM) units, that operate as hash tables. Each one of the ternary match tables and exact match tables of some embodiments includes a number of entries (e.g., flow entries) each of which matches against the values of one or more packet header fields and instructs the action engine 430 of the same stage to take a particular action (e.g., an action stored in a SRAM unit of an action table).

In some embodiments the ternary match table stores packet header data that can include ternary bits (i.e., bits with values of 0, 1 or wildcard). Wildcarding the bits allow a single table entry to match a wide variety of packet header fields. The exact match table of some embodiments does not allow any wildcarding, hence the packets must exactly match the table entries. When the header field is matched against an entry of a match table (a ternary table or an exact match table), a pointer that contains the required information to perform the desired actions is retrieved from that entry of the match table. The desired actions include simple actions such as setting a field in the PHV to a particular value or dropping a packet, as well as complex operations, such as adding encapsulations to the packet (e.g., Provider Backbone Bridges (PBB) encapsulation, GRE or GENEVE tunneling, etc.).

In some embodiments, the VLIW action engine 430 includes different action operations that may receive their sources from packet header fields (which is why a copy of the PHV registers are directly delivered to the action unit), or from an action memory (not shown). An action indicated by a match may be simple and require only a small amount of data from the action memory or complex and require a large amount of data. When the action engine 430 receives the action data (from the action memory or the PHV), the action engine takes the required action which may include modifying a header field in the PHV (e.g., to decrement the TTL field of the IP header, change the address of the packet, etc.), or taking another action such as assigning the packet to an output port and/or queue, sending the packet to the controller, dropping the packet, etc.

After the required action is taken (e.g., when a match is found) in each stage of the MAU, the PHV (as modified by the action, if such modifications are performed) is delivered to the next stage of the MAU for further processing. In some embodiments, each successive PHV that includes the packet header data of one packet progresses through the pipeline of match-action stages one clock cycle behind the previous PHV.

The last match-action stage of the MAU, after processing the PHV, delivers the processed PHV to the deparser 460. As described above, after receiving the PHV of a particular packet from the MAU, the deparser 460 of some embodiments reassembles the packet by putting together the processed header fields that are received from the MAU, with the payload 450 of the packet that is received directly from the parser 410. The packet is then either sent out of the switch (if the deparser is an egress deparser), or sent to the queuing system (if the deparser is an ingress deparser) for further processing by the egress pipeline of the switch. The packet may also be dropped in the ingress or egress pipeline.

As described above, the controller configurator (e.g., the P4 programmer) who provides the data plane description does not need to know the details of the underlying forwarding element. Instead, a compiler receives one or more data plane descriptions that are written for one or more FEs and generates the configuration data for the one or more FEs based on the capabilities of each FE. In other words, the compiler maps a target-independent data plane description (written in P4 language) into a target-dependent configuration data. Using such a compiler, the programmer merely decides how the forwarding plane processes packets without worrying about implementation details. As will be described in more detail below, the compiler of some embodiments uses a table dependency graph that can be mapped to many specific forwarding elements in order to convert the target independent P4 code to the target dependent configuration data.

Figure 5:
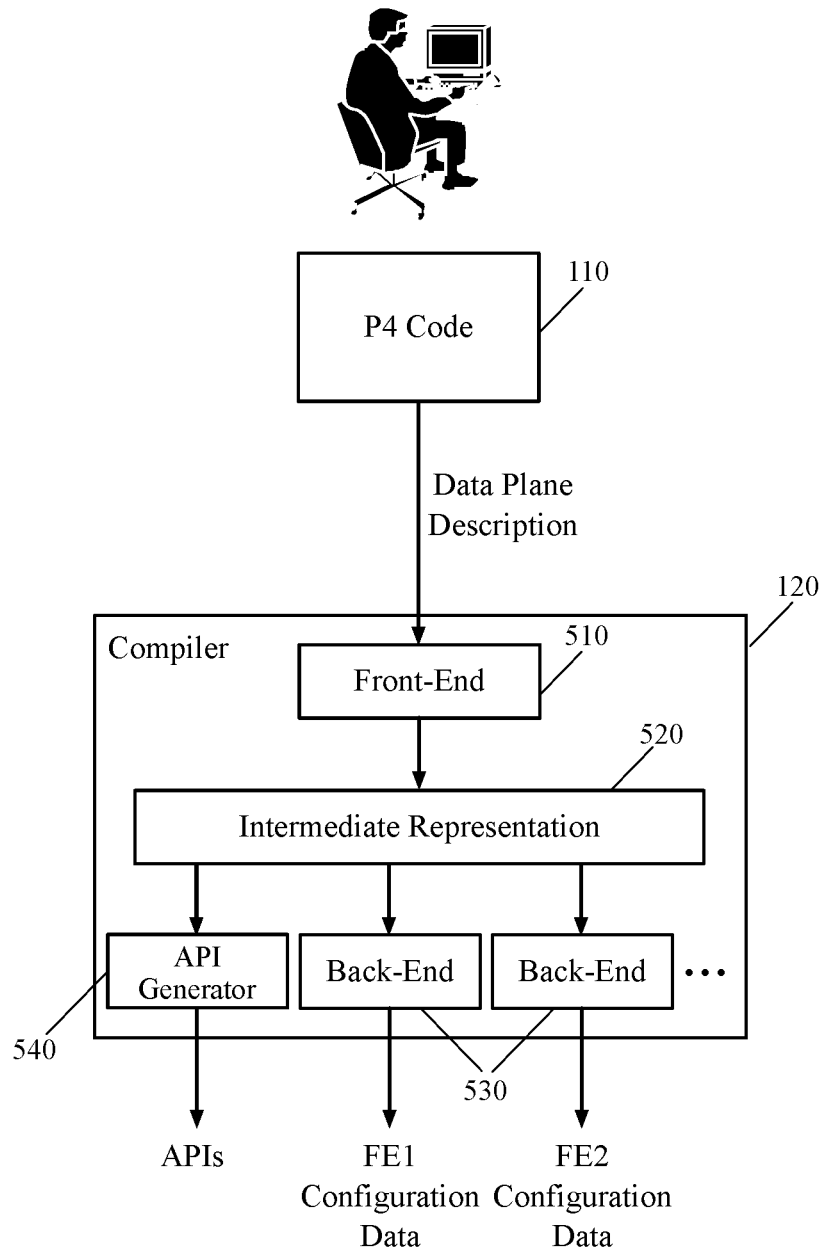
FIG. 5 illustrates different modules of a compiler of some embodiments that is capable of generating configuration data for one or more forwarding elements in parallel with a set of APIs.

FIG. 5 illustrates different modules of a compiler of some embodiments that is capable of generating configuration data for one or more forwarding elements in parallel with a set of APIs. More particularly, the figure shows a compiler that receives, at a front-end module, a data plane description from a P4 programmer and generates, at a back-end module, configuration data for a particular switch. The compiler also generates a set of APIs for the particular switch through an API generator module that operates in parallel with the other back-end modules. The figure includes a compiler 120 and a P4 code 110. The compilers 120 includes a front-end module 510, intermediate representation 520, a set of back-end modules 530, and an API generator 540.

In order to map the target-independent data plane description onto the target switches' specific hardware or software platform the compiler of some embodiments performs a two-stage compilation process. In the first stage, a front-end module of the compiler of some embodiments converts the P4 code that describes the data plane into an intermediate representation (i.e., a table dependency graph representation), which could be analyzed to determine the dependencies between the different match-action tables defined in the P4 code. In the second stage, a set of back-end modules determines the structure (e.g., a set of resources) of each forwarding element that is to be configured, and based on the particular structure of each FE, a backend module maps the intermediate representation onto the FE's specific resources. In other words, each of the back-end modules is a target-specific module that maps the dependency graph onto a particular type of forwarding element. For example, a first back-end module uses the data in the table dependency graph to generate configuration data for a first type of forwarding element (e.g., a hardware switch), while a second back-end module uses the intermediary data to generate configuration data for a second type of forwarding element (e.g., a software switch).

The control flow specification 160 that was shown in FIG. 1 is a convenient way to specify the forwarding behaviors of a forwarding element. However, the control flow, which is defined by the P4 programmer, does not explicitly specify the dependencies between the different match-action tables. That is, the control flow does not specify the match-action tables that can be processed in parallel. This is mainly because the programmer expresses the serial dependencies between different header fields of a packet. For example, the programmer specifies that for an Internet Protocol (IP) routing table and an Address Resolution Protocol (ARP) table, a sequential execution is required due to the data dependency between these tables.

In other words, the user can specify the sequence of execution of tables in the different match-action stages of the match-action unit through the control flow specification. As such, the front-end module 510 of the compiler 120, after analyzing the control flow (in the P4 code), identifies the dependencies between the different match-action tables and looks for opportunities to process header fields concurrently. The front-end module 510 then generates the intermediate representation 520 based on such an analysis. The intermediate representation includes a table dependency graph that represents all of the dependencies (parallel and sequential) between the tables, as well as other information such as different tables' names and other data related to the match-action tables.

Each one of the back-end modules 530 analyzes the specific resources of the forwarding element for which the compiler is to generate the configuration data, and based on that analysis and the dependency information in the table dependency graph, maps the intermediate representation to the specific resources of the forwarding element. In other words, each back-end 530 generates configuration data for a particular FE from the intermediate representation 520, based on the specific resources of the particular FE.

The compiler of some embodiments also generates a set of APIs for any of the FEs that is configured by the compiler's generated configuration data. The API generator module 540, which operates as a back-end module in parallel with the other back-end modules of the compiler, generates the APIs also based on the data in intermediate presentation 520. That is, in order to simultaneously generate a set of run time APIs, the compiler of some embodiments provides an API generator module 540 as one of the back-end modules that also uses the data in the table dependency graph representation in order to generate the APIs. The API generator module in some embodiments is a templating engine that receives (from the intermediate representation) data for each match-action table of the data plane and generates a set of APIs for that table based on the type of the table (e.g., based on the specific types of the table's resources) and based on the table's dependencies.

Figure 6:
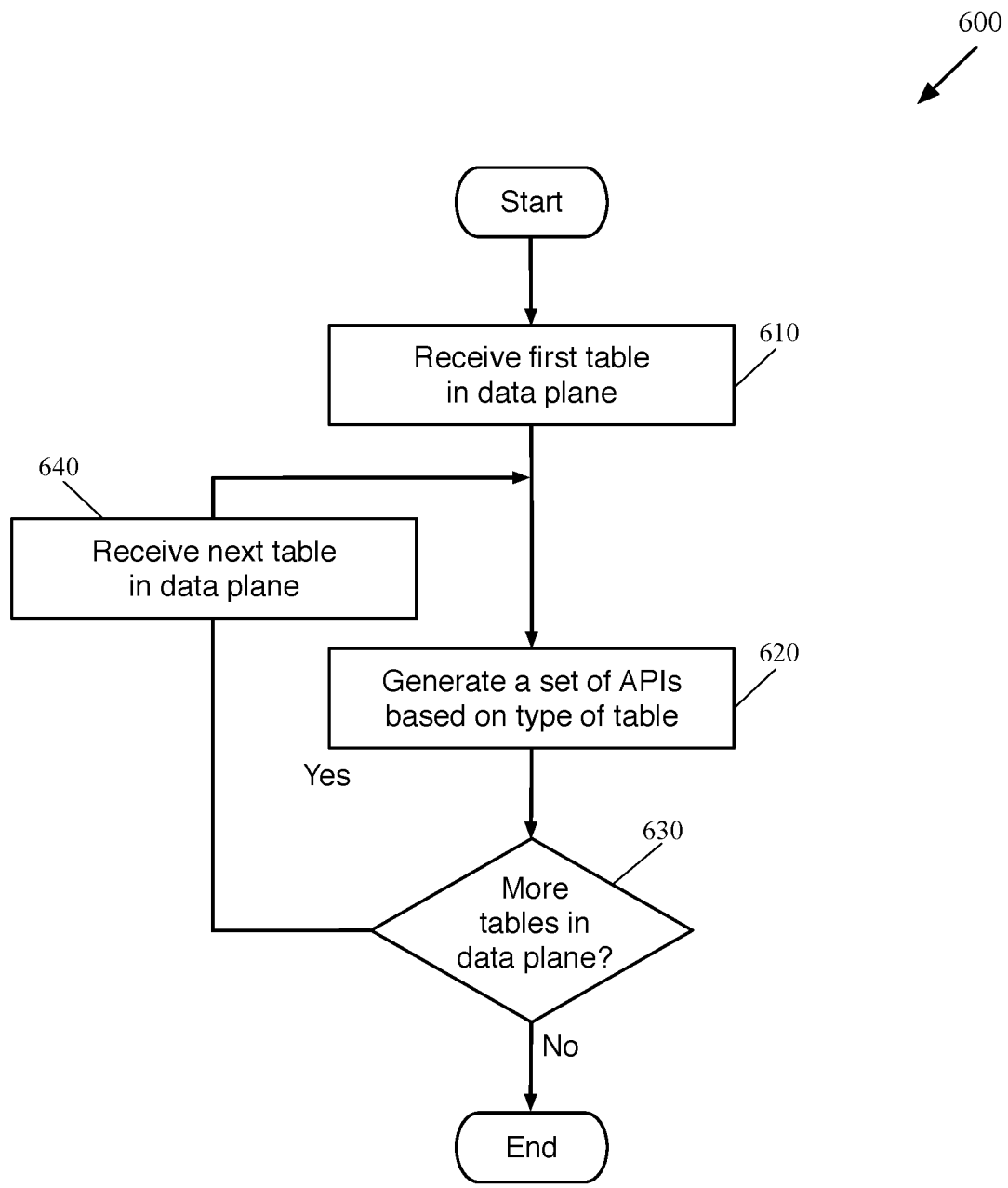
FIG. 6 conceptually illustrates a process that a compiler of some embodiments performs for generating a set of APIs for each match-action table of a data plane.

FIG. 6 conceptually illustrates a process 600 of some embodiments that generates a set of APIs for each match-action table of the data plane. In some embodiments, the process 600 is performed by an API generator module such as the API generator module 540 shown in FIG. 5. As described above, the API generator module of some embodiments is a templating engine that performs as one of the back-end modules of the compiler.

The process 600 starts by receiving (at 610) the first table's data from the intermediate representation that is generated by the front-end module of the compiler. As described above, the intermediate representation includes a table dependency graph and other related data for the tables. In some embodiments, the front-end module of the compiler generates the intermediate representation from the data plane description provided in the P4 code. The front-end module analyzes the control flow data provided in the P4 code and generates the dependency graph based on the analysis. The dependency graph indicates which tables can be processed in parallel and which tables have to be processed after or before another tables is processed.

After receiving the first table data, the process generates (at 620) a set of APIs for the first table. The set of APIs, as described above, allows a control plane programmer to populate the configured table on the forwarding element based on the run time requirements of the network (e.g., in a datacenter). That is, using the generated set of APIs, a control plane programmer is able to add, remove, or modify table entries for a table that is configured on the forwarding element.

The process then determines (at 630) whether there are more match-action tables that have to be processed in the data plane. When the process determines, based on the data received from the intermediate representation, that no more match-action table is left in the data plane, the process ends. On the other hand, when the process determines that there are more match-action tables to process, the process receives (at 640) the next table's data (from the intermediate representation) and returns to operation 620 to generate a new set of APIs for the next received table.

One of ordinary skill in the art will recognize that the specific operations of the process 600 may not be performed in the exact order shown and described above. Additionally, the specific operations may not be performed in one continuous series of operations, and different specific operations may be performed in different embodiments. Furthermore, the process could be implemented using several sub-processes, or as part of a larger macro process.

As described above, the API generator of some embodiments functions as a templating engine. The API generator of some embodiments includes, among other modules, a parsing module and a populate module. In some embodiments, the parsing module scans the table definition received from the dependency graph and extracts the different fields of the table. The parser module then substitutes the extracted fields with new variables to generate an API template for the populate module. The populate module generates the final set of APIs based on the variables received from the parser module.

Figure 7:
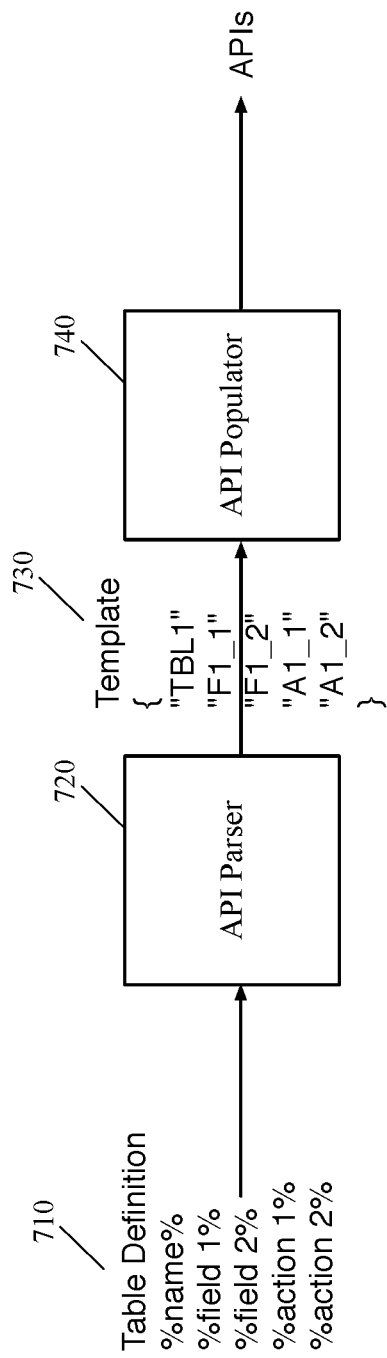
FIG. 7 illustrates an API generator architecture of some embodiments that receives data for each match-action table from the intermediate representation and generates a set of APIs for the match-action table.

FIG. 7 illustrates an API generator architecture 700 of some embodiments that receives data for each match-action table from the intermediate representation and generates a set of APIs for the match-action table. As shown, the API generator includes, among other modules that are not shown, an API parser module 720 and an API populating module 740.

The API parser module 720, in some embodiments, receives the table's data from the intermediate representation in a particular format. As shown in the illustrated example, the API parser module 720 receives a particular table's definition 710, which includes the name of the table, the fields of the table, and the specified actions for the table. The API parser module generates an API template 730 based on the received information. The API template 730 includes a set of variables, each of which substitutes a corresponding parsed item of the table.

The API parser of some embodiments is capable of generating different styles of API (e.g., Switch Abstraction Interface (SAI) APIs, propriety APIs, etc.) based on the same table's data that is received from the intermediate representation. These different styles of APIs can be used by different control application as needed. In some embodiments, the API parser generates different types of variables for different API templates based on the received data in the table definition. Generating different types of templates results in the API generator module of some embodiments to be able to generate different styles of APIs for the tables that are described for the data plane. The API parser 720 then distributes the generated API template 730 to the API populating module 740.

The API populating module 740, based on the variables defined for each table, generates a set of APIs for that table. In some embodiments each generated API (by the API populating module 740) includes a header file and a mapping function (e.g., a C program) that maps the header file to lower level registers of the forwarding element (to modify the registers). A header file, in some embodiments, typically includes a match-spec, which is the key for the table (e.g., to add an entry), an action-spec, which specifies what action to execute, and the parameters for the action (e.g., to associate a meter or a counter with the action). In some embodiments a same mapping function is used by different API headers that are generated for different tables. In some such embodiments, the function only receives, as a parameter, the name of the table that has to be mapped to the forwarding element.

Some of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
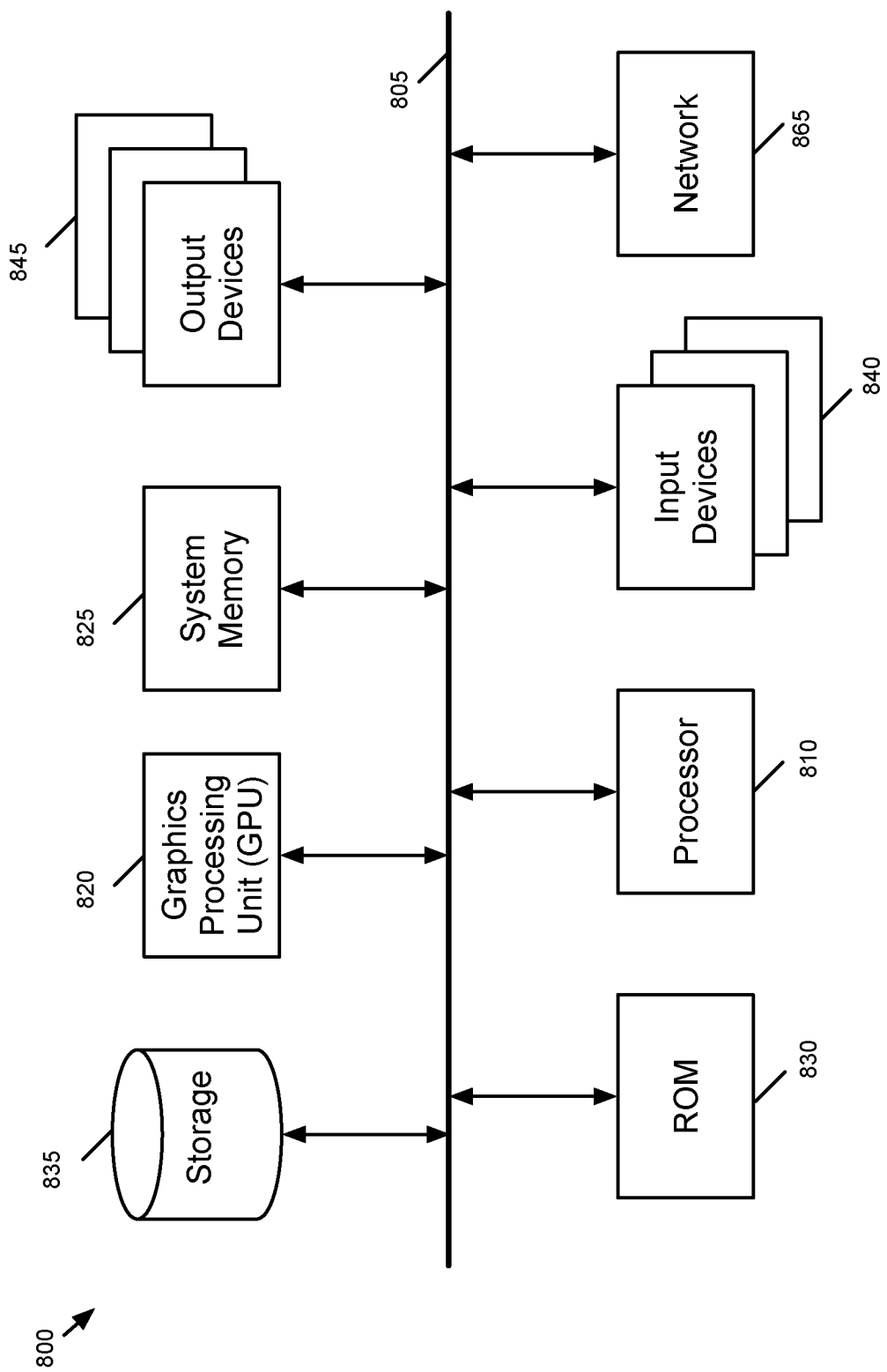
FIG. 8 conceptually illustrates an electronic system with which some embodiments of the invention are implemented.

FIG. 8 conceptually illustrates an electronic system 800 with which some embodiments of the invention are implemented. The electronic system 800 can be used to execute any of the control, virtualization, or operating system applications described above. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieves instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such a random access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieves instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 2 and 6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for generating Application Programming Interfaces (APIs) and configuration data for programming a forwarding element for forwarding packets in a network, the method comprising:
   at a compiler,
      receiving a data plane description that describes packet forwarding processing of a data plane of the forwarding element;
      based on the description, generating configuration data for configuring the forwarding element to forward packets;
      based on the description, generating a plurality of APIs to configure packet forwarding processing of the data plane of the forwarding element;
      providing the generated configuration data to a control plane application to use to define an initial configuration of the packet forwarding processing of the data plane of the forwarding element; and
      providing the generated set of APIs to the control plane application to modify the configured packet forwarding processing of the data plane of the forwarding element during runtime.

2. A method of claim 1, wherein the data plane description comprises program code that describes the packet forwarding processing of the data plane of the forwarding element.

3. The method of claim 2, wherein the program code is written in P4 programming language.

4. The method of claim 1, wherein the configuration data configures, in the data plane of the forwarding element, a set of match and action tables to process packets through a plurality of match-action stages.

5. The method of claim 4, wherein generating the plurality of APIs comprises, for each table, generating a subset of the plurality of APIs through which the table is populated on the data plane of the forwarding element.

6. The method of claim 1, wherein the received data plane description is in a first, generic format, and the forwarding element is a particular type of forwarding element, wherein generating the configuration data comprises:
  generating intermediate representation data in an intermediate second format from the data plane description; and
  based on the generated intermediate representation data, generating the configuration data for a set of specific resources of the data plane of the forwarding element in a third format specific to the particular type of forwarding element.

7. The method of claim 6, wherein the plurality of APIs are generated based on the generated intermediate representation data.

8. The method of claim 6, wherein the generated intermediate representation data comprises a table dependency graph that specifies dependencies between a set of match-action tables.

9. The method of claim 1, wherein the control plane application uses the configuration data to configure the packet forwarding processing of the data plane of the forwarding element at an initialization time of the forwarding element and the plurality of APIs to control the data plane of the forwarding element during a run time.

10. The method of claim 1, wherein the data plane description is received from a first user that configures the forwarding element, wherein the generated APIs are used during run time by a second user that programs the configured forwarding element.

11. The method of claim 1, wherein the data plane description comprises a program code written in a programming language, wherein the configuration data and the plurality of APIs are generated by the compiler during a compilation of the program code.

12. The method of claim 1, wherein the forwarding element comprises a reconfigurable hardware forwarding element.

13. The method of claim 1, wherein the forwarding element comprises a reconfigurable software forwarding element.

14. A non-transitory machine readable medium storing a compiler program executable by at least one processing unit, the program for generating Application Programming Interfaces (APIs) and configuration data for programming a forwarding element for forwarding packets in a network, the program comprising sets of instructions for:
  receiving a data plane description that describes packet forwarding processing of a data plane of the forwarding element;
  based on the data plane description, generating configuration data for configuring the forwarding element to forward packets; and
  based on the data plane description, generating a plurality of APIs to configure packet forwarding processing of the forwarding element;
  providing the generated configuration data to a control plane application to use to define an initial configuration of the packet forwarding processing of the data plane of the forwarding element; and
  providing the generated set of APIs to the control plane application to modify the configured packet forwarding processing of the data plane of the forwarding element during runtime.

15. The non-transitory machine readable medium of claim 14, wherein the received data plane description is in a first, generic format, and the forwarding element is a particular type of forwarding element, wherein the set of instructions for generating the configuration data comprises sets of instructions for:
  generating intermediate representation data in an intermediate second format from the data plane description; and
  based on the generated intermediate representation data, generating the forwarding element specific configuration data in a third format specific to the particular type of forwarding element.

16. The non-transitory machine readable medium of claim 15, wherein the intermediate representation comprises a table dependency graph that specifies dependencies between a set of match-action tables and the set of instructions for generating the plurality of APIs comprises a set of instruction for generating a subset of APIs for each match-action table's data received from the intermediate representation data based on a type of the table.

17. The non-transitory machine readable medium of claim 14, wherein the configuration data configures, in the data plane of the forwarding element, a plurality of match-action tables to process packets through a plurality of match-action stages of the forwarding element.

18. The non-transitory machine readable medium of claim 17, wherein the set of instructions for generating the plurality of APIs comprises a set of instructions for generating, for each table, a subset of the plurality of APIs through which the table is populated in the data plane of the forwarding element.

19. The non-transitory machine readable medium of claim 17, wherein the controller application controls the forwarding processing by populating the plurality of match-action tables that are configured on the forwarding element.

20. The non-transitory machine readable medium of claim 14, wherein the forwarding element comprises a hardware switch.

* * * * *